Patented June 8, 1954

2,680,765

UNITED STATES PATENT OFFICE 2,680,765

GAMMA-ACYLOXY-TERTIARY AMINES

James M. Sprague, Drexel Hill, and Everett M. Schultz, Glenolden, Pa., assignors to Merck & Co., Inc., a corporation of New Jersey No Drawing. Application June 5, 1951, Serial No. 230,090

1 Claim. (Cl. 260—490)

This invention is concerned with certain new chemical compounds. It is more particularly concerned with gamma-acyloxy-tertiary amines containing as a substituent on the carbon atom to which the acyloxy substituent is attached an arylmethyl group containing one substituent on the methyl carbon atom of the arylmethyl group.

The new chemical compounds embraced by this invention can be represented by the general formula

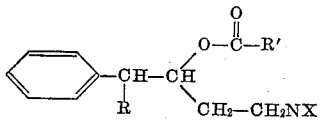

in which R is chosen from the group consisting of lower alkyl, cycloalkyl, benzyl, and phenyl, R' is chosen from the group consisting of alkyl and phenyl, and NX is chosen from the class consisting of di-loweralkylamino, 1-piperidyl and 4-morpholinyl. The gamma-acyloxy-tertiary amines of this invention are obtained by acylation of an appropriate gamma-hydroxy-tertiary amine, the preparation of which is described in U. S. patent application Serial No. 151,044, filed March 21, 1950, now abandoned, of which this application is in part a continuation.

The compounds of this invention are obtained by the esterification of the above referred to carbinols according to known chemical methods with such acids as acetic, propionic, benzoic, and in general any carboxylic acid. It is convenient to use the acid anhydride or acid chloride of the appropriate acid to acylate the carbinol.

The acetoxy, propionoxy, and benzoxy derivatives of the below-listed carbinols are illustrative, but not restrictive, of the scope of this invention.

1-phenyl-1-methyl-4-dimethylamino-2-butanol hydrochloride
1-phenyl-1-methyl-4-(1-piperidyl)-2-butanol hydrochloride
1-phenyl-1-ethyl-4-dimethylamino-2-butanol hydrochloride
1-phenyl-1-ethyl-4-(4-morpholinyl)-2-butanol hydrochloride
1-phenyl-1-ethyl-4-(1-piperidyl)-2-butanol hydrochloride
1-phenyl-1-isopropyl-4-dimethylamino-2-butanol hydrochloride
1-phenyl-1-isopropyl-4-(1-piperidyl)-2-butanol hydrochloride
1-phenyl-1-propyl-4-(4-morpholinyl)-2-butanol hydrochloride
1-phenyl-1-n-propyl-4-dimethylamino-2-butanol hydrochloride
1-phenyl-1-n-propyl-4-(1-piperidyl)-2-butanol hydrochloride
1-phenyl-1-cyclohexyl-4-dimethylamino-2-butanol hydrochloride
1-phenyl-1-n-butyl-4-dimethylamino-2-butanol hydrochloride
1-phenyl-1-lauryl-4-dimethylamino-2-butanol hydrochloride
1-phenyl-1-benzyl-4-dimethylamino-2-butanol hydrochloride
1-phenyl-1-benzyl-4-(1-piperidyl)-2-butanol hydrochloride
1,1-diphenyl-4-dimethylamino-2-butanol hydrochloride
1,1-diphenyl-4-diethylamino-2-butanol hydrochloride
1,1-diphenyl-4-(1-piperidyl)-2-butanol hydrochloride It will be realized that the radicals represented by R and NX in the general formula and occurring in the foregoing compounds can be replaced by the other radicals represented by a particular symbol to give a variety of compounds other than those specifically enumerated above and it is intended that these be included within the present disclosure.

The compounds of this invention are useful for their anticholinergic properties.

The invention is illustrated by, but not restricted to, the following examples:

*Example 1.—1-phenyl-1-n-propyl-2-acetoxy-4-dimethylaminobutane hydrochloride*

A mixture of 1-phenyl-1-n-propyl-4-dimethylamino-2-butanol hydrochloride (16.5 grams) and acetic anhydride (32.5 grams) was boiled under reflux for two hours. The mixture was cooled and the 250 ml. of ether added. The crystalline solid that separated was recrystallized twice from isopropyl alcohol to yield 1-phenyl-1-n-propyl-2-acetoxy-4-dimethylaminobutane hydrochloride, M. P. 130–132°.

*Example 2.—1,1-diphenyl-2-propionoxy-4-diethylaminobutane hydrochloride*

1,1-diphenyl-4-diethylamino-2-butanol hydrochloride and propionic anhydride (19.5 grams) were boiled under a reflux condenser for 2½ hours. The solution was cooled and 200 ml. of ether added. The crystalline solid that separated was recrystallized twice from a solvent consisting of 3 parts of isopropyl ether and 1 part of isopropyl alcohol. There was produced 1,1-diphenyl-2-propionoxy-4-diethylaminobutane hydrochloride M. P. 136.5–138° C.

Example 3.—1-phenyl-1-benzyl-2-benzoxy-4-(1-piperidyl)-butane hydrochloride 1-phenyl-1-benzyl-4-(1-piperidyl)-2-butanol hydrochloride (12.0 grams) was dissolved in 100 ml. of benzene. Powdered sodium hydroxide (20 grams) was added and the mixture was shaken for 30 minutes. The solid material was then filtered off and benzoyl chloride (6.3 grams) added to the solution. The solution was then heated at 60° C. for two hours and let stand at room temperature for approximately 15 hours. Then 500 500 ml. of ether was added. The crystalline solid which separated was recrystallized twice from acetone to yield 6.5 grams of 1-phenyl-1-benzyl-2-benzoxy-4-(1-piperidyl)-butane hydrochloride, M. P. 170–171° C.

Other examples of the invention are not included because to do so would be repetitious as the esterification step is known in the art.

Example 4.—1,1-diphenyl-2-propionoxy-4-diethylaminobutane 1,1-diphenyl-2-propionoxy-4-diethylaminobutane hydrochloride (obtained as in Example 2) was dissolved in water and the solution made basic with 20% sodium hydroxide solution. The free amine was taken up in ether and ether solution was washed twice with half volume portions of water and dried over potassium carbonate. The potassium carbonate was removed by filtration and the filtrate evaporated to dryness. There was obtained the desired product, 1,1-diphenyl-2-propionoxy-4-diethylaminobutane which was purified by distillation under vacuum.

The above outlined procedure to obtain the free amine from the hydrochloride is applicable to any of the hydrochloride salts of the compounds of this invention. It will be realized that in those cases where the free amine is a solid it can be purified by recrystallization. Other examples of the isolation of free amines of the compounds of this invention are not included because to do so would be repetitious.

What is claimed is:

1-phenyl-1-n-propyl-2-acetoxy-4-dimethylaminobutane hydrochloride.

References Cited in the file of this patent

FOREIGN PATENTS

| Number | Country | Date |
|---|---|---|
| 265,665 | Switzerland | Apr. 1, 1950 |